(12) United States Patent
Johannaber et al.

(10) Patent No.: US 7,255,050 B2
(45) Date of Patent: Aug. 14, 2007

(54) PNEUMATIC SINGLE GRAIN SOWING MACHINE

(75) Inventors: Stefan Jan Johannaber, Lienen (DE); Richard Schmidt, Hude (DE); Rüdiger Steen, Bunde (DE); Michael Pokriefke, Hude (DE)

(73) Assignee: Amazonen-Werke, H. Dreyer GmbH & Co KG, Hasbergen-Gaste (DE)

( * ) Notice: Subject to any disclaimer, the term of this patent is extended or adjusted under 35 U.S.C. 154(b) by 0 days.

(21) Appl. No.: 11/404,628

(22) Filed: Apr. 14, 2006

(65) Prior Publication Data

US 2006/0230998 A1 Oct. 19, 2006

(30) Foreign Application Priority Data

Apr. 16, 2005 (DE) .................... 10 2005 017 601

(51) Int. Cl.
*A01C 7/00* (2006.01)
*A01C 9/00* (2006.01)

(52) U.S. Cl. ............................................. 111/185

(58) Field of Classification Search ........ 111/179–182, 111/185
See application file for complete search history.

(56) References Cited

U.S. PATENT DOCUMENTS

2003/0110996 A1 6/2003 Leroy et al.

FOREIGN PATENT DOCUMENTS

DE 4303101 8/1994
EP 0598635 5/1994

*Primary Examiner*—Christopher J. Novosad
(74) *Attorney, Agent, or Firm*—Horst M. Kasper

(57) ABSTRACT

Pneumatic single grain sowing machine having a seeds storage container, and an individualization device subjected to air pressure, exhibiting perforations and rotating. The individualization device is led with its region disposed below the rotation axis at least in part to the placing of seed grains at the perforations through a seed storage led from the storage container to the individualization device. A separating wall is disposed between the storage container and the individualization device and determining the seed storage height level and extending at a distance to the individualization device in a vertical direction. In order to furnish a single grain sowing machine wherein the part segments with thereon disposed storage containers and individualization devices can be pivoted by 90 degrees around the horizontally running swivel axis, an adjustably formed blocking device is disposed between the individualization device and the separating wall in the region of the lower end of the separating wall and above the seed storage height level, wherein the blocking device closes in the intermediate space between the individualization device and the separating wall.

11 Claims, 5 Drawing Sheets

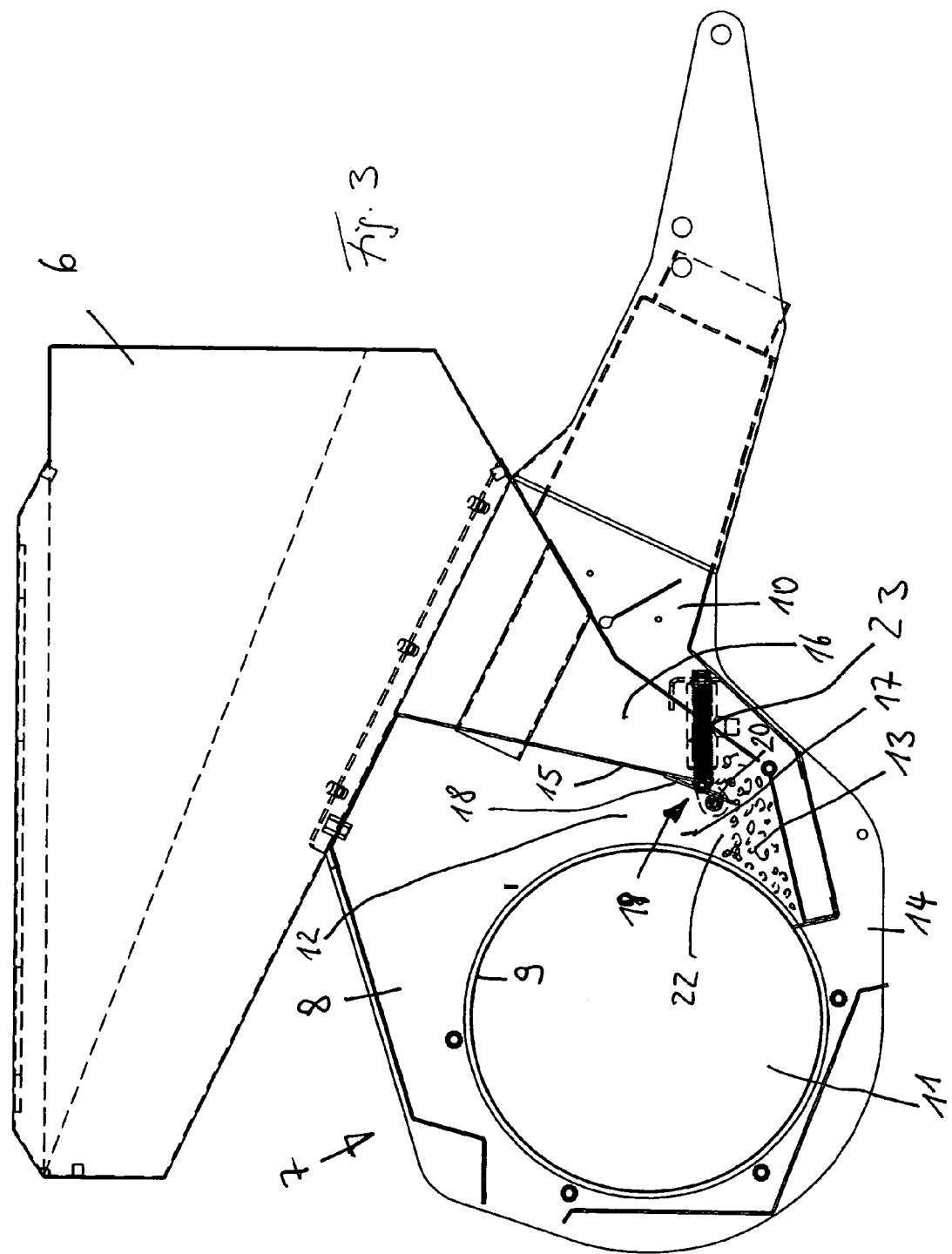

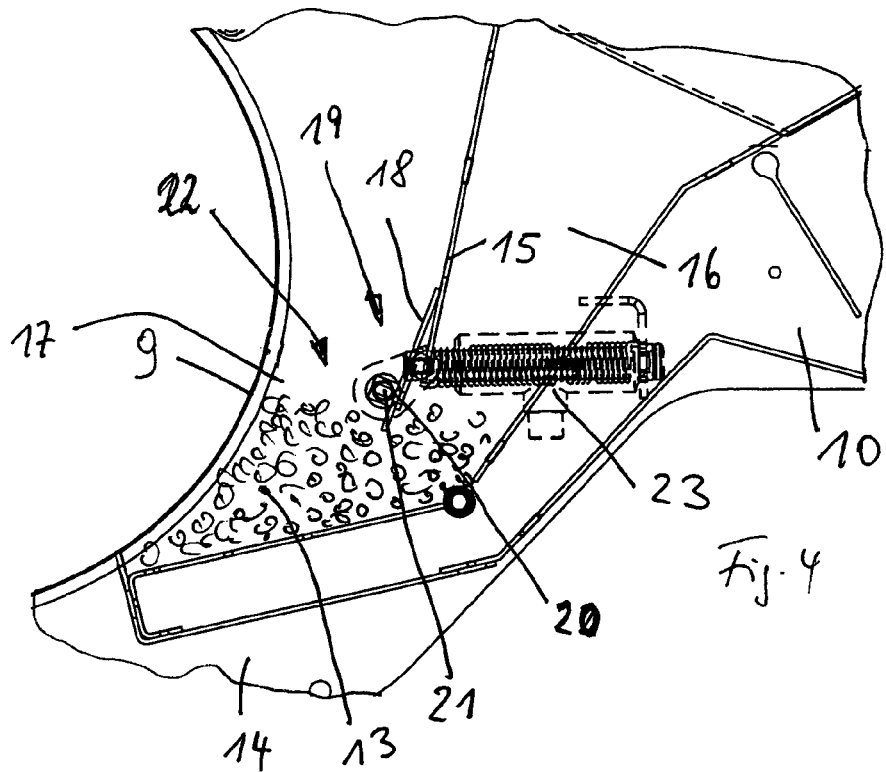
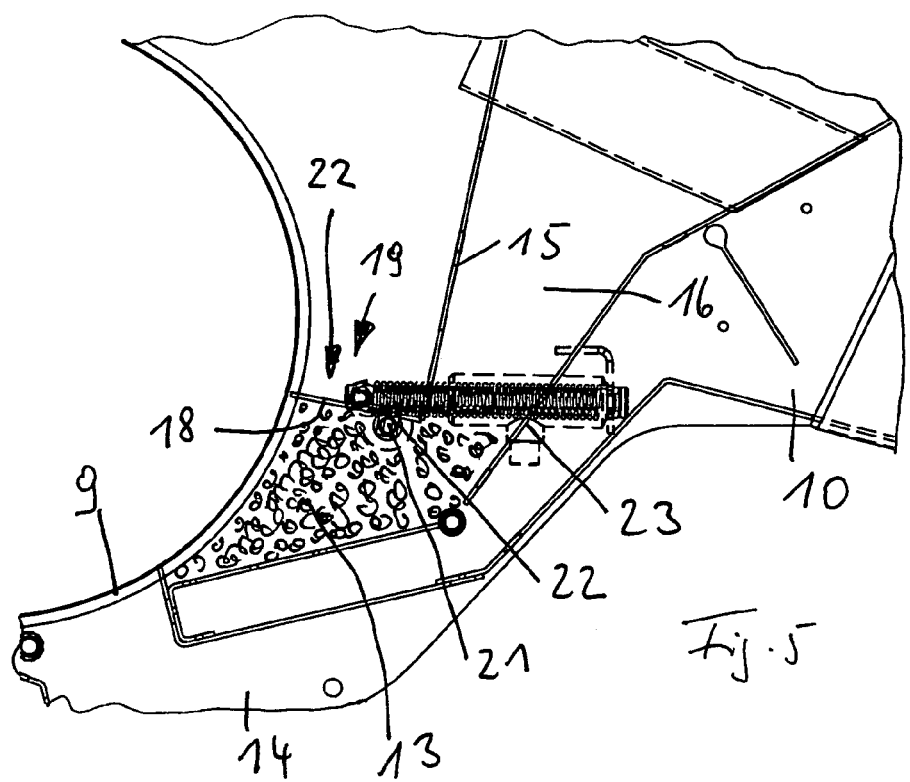

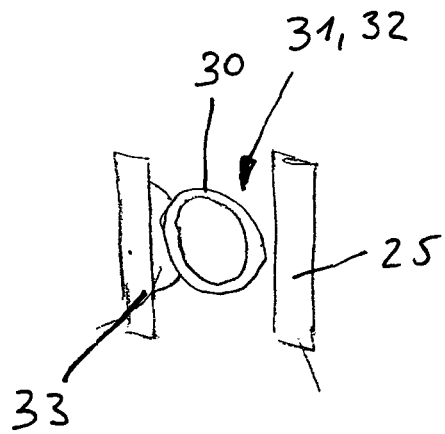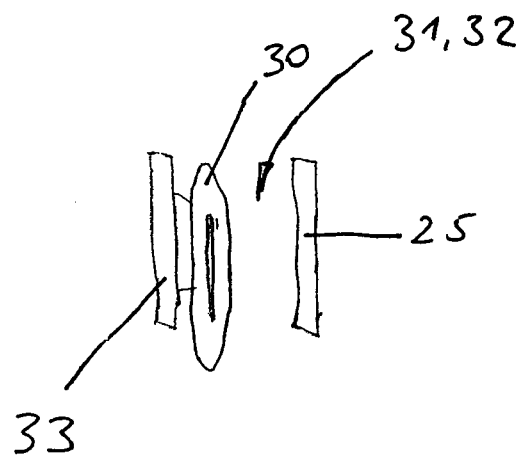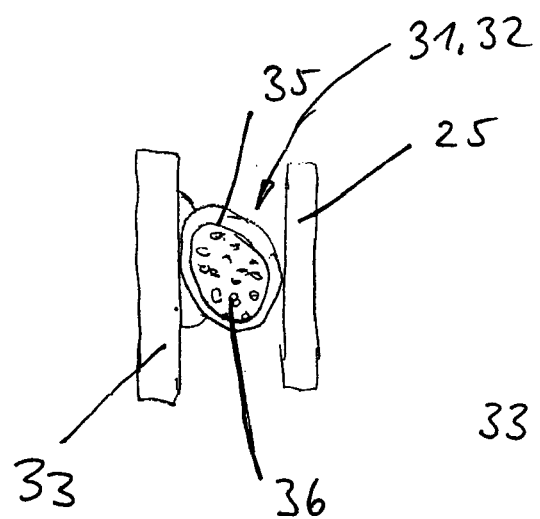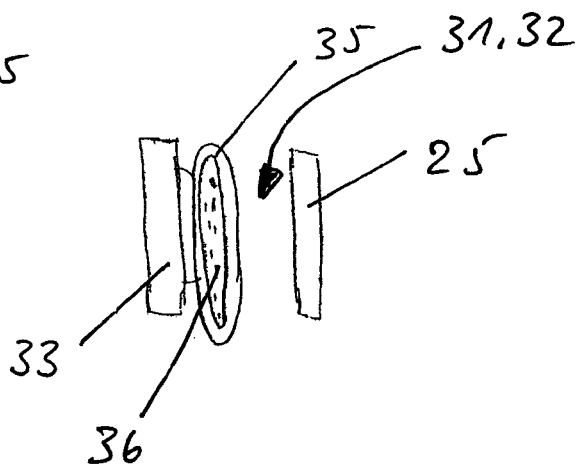

PNEUMATIC SINGLE GRAIN SOWING MACHINE

BACKGROUND OF THE INVENTION

1. Field of the Invention

The Invention relates to a pneumatic single grain sowing machine having a seeds storage container, an air pressure operated, perforations exhibiting, and rotating individualization device, wherein the individualization device with the region of the individualization device disposed below the rotation axis at least in part is guided for the location of seed grains at the perforation by a seeds storage fed from the storage container to the individualizing device.

2. Brief Description of the Background of the Invention Including Prior Art

Such as single grain sowing machine is known from the European patent document EP 0598636 B1. The problem with such a single grain sowing machine of large work width comprises that the individual side segments have to be brought from the working position into a transport position relative to the center part. Previous flap in mechanisms comprise that a parallelogram like linkage of rods is disposed between the center part and the side segments, wherein the outer section is pivoted in over the center part by way of the parallelogram like linkage of rods. This hinge technology is very expensive and costly. For example the German printed patent document 4303101 shows such a pivoting in.

Other hinge technologies, in particular in connection with agricultural implements and apparatus, where there are no storage containers with individualizing devices are disposed at the foldable side segments, the side segments are pivoted in around a swivel axis running in drive direction by 90 degrees in upward direction into a transport position. This however is not possible with single grain sowing machines, where the storage containers with the individualization devices are disposed at the foldable side segments, since the seed grains run into the open from the storage container through the intermediate space between the individualization device and the separating wall separating the storage container from the individualization chamber and through the individualization chamber.

Purposes of the Invention

It is an object of the in the present Invention to create a single grain sowing machine wherein the side segments with the storage containers and individualization devices disposed thereon can be pivoted by 90 degrees around a horizontally running swivel axis into a transport position.

These and other objects and advantages of the present invention will become evident from the description which follows.

BRIEF DESCRIPTION OF THE INVENTION

According to the present Invention an adjustably formed blocking device is disposed between the individualization device and the separating wall in the region of the lower end of the separating wall and above the seeds storage height level, wherein the blocking device closes in the intermediate space between the individualization device and the separating wall.

Based on these constructive steps, the intermediate space between the individualization device and the separating wall is closed by the blocking device prior to the swiveling of the respective side segment with the respective storage container and the individualization device from the working position into the transport position. Thus seeds from the storage container or, respectively, the seeds resting at the individualizing device can neither flow into the open nor fill the individualization chamber in the region of the individualization device in an undesirable way.

According to one embodiment the blocking device is formed as a flap pivotable around a swivel axis.

It is furnished that the swivel axis of the flap is disposed in the neighborhood of the separating wall in order to be able to bring the flap in a simple way into a position during the discharge and individualising process, with the purpose that the flap does not interfere with the individualizing process during the individualizing process. The flap can swivel thereby immediately to the separating wall.

According to a further embodiment the blocking device is formed as an inflatable and/or swelling tubular like jacket. Based on these constructive steps there results a simple constructive blocking device, where the blocking device safely seals and requires little service.

The tubular like jacket is evacuated with under pressure and thereby collapses and releases the intermediate space to be blocked with the purpose that the tubular like jacket assumes its respective extension for blocking or releasing.

It is also possible to deform or, respectively, to relax the tubular like jacket with mechanical elements such as for example an electrical pulling magnet, a setting motor, a hydraulic cylinder.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 3 is a side elevational view of the individualization device with storage container, wherein the blocking device is disposed in a parking position, FIG. 4 is a view of the lower region of the individualizing device with the blocking device disposed in a parking position according to FIG. 3 at an enlarged scale, FIG. 5 is a detail view of the individualization device in the representation according to FIG. 4, wherein the blocking device is disposed in blocking configuration, FIG. 7 is a sectional view of the blocking device formed as a tubular like jacket, a principal view and in blocking position, FIG. 8 is a view of the tubular like jacket according to FIG. 7 in a parking position FIG. 9 is a sectional view of a further blocking device formed as the tubular like jacket, in a principal view and in blocking position, FIG. 10 is a sectional view of the tubular like jacket according to FIG. 9 in a parking position.

DESCRIPTION OF INVENTION AND PREFERRED EMBODIMENT

Figure 1:
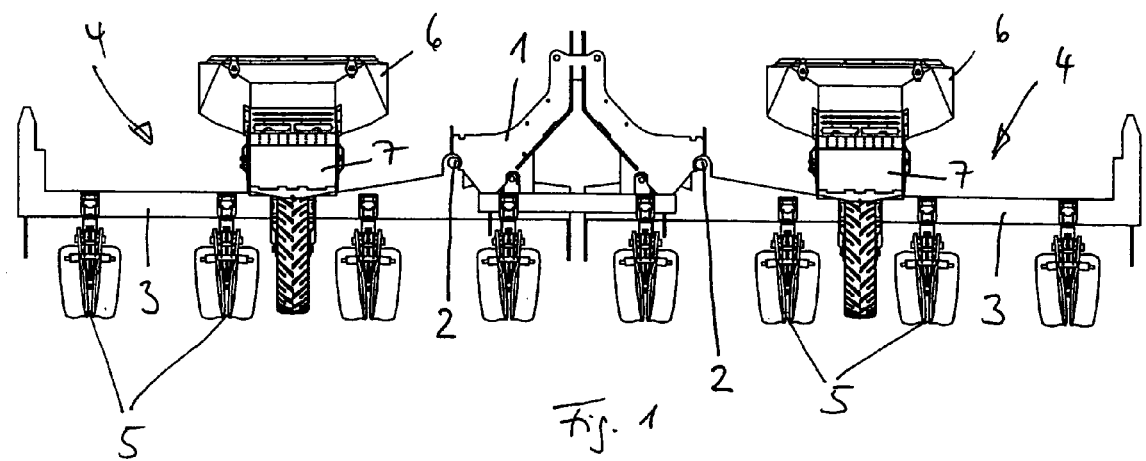
FIG. 1 is a rear elevational view of the single grain sowing machine in working position and in a principal representation.
Figure 2:
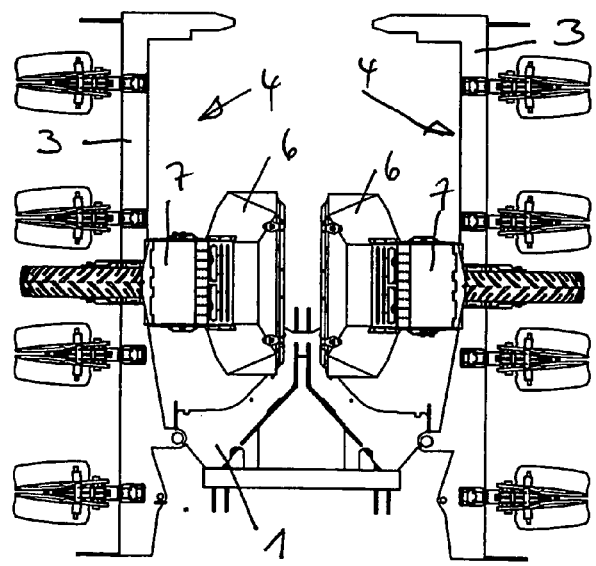
FIG. 2 is a rear elevational view of the single grain sowing machine with part segments pivoted in transport position with the in each case storage containers disposed at the part segments and individualization device in transport position disposed at the part segments and in a principal presentation.

The sowing machine formed as a single grain sowing machine comprises a middle frame 1, wherein the support beams 3 of the side segments 4 are disposed at the middle frame by way of the swivel hinges 2, wherein the swivel axis of the swivel hinges 2 run in the drive direction. Several sow shares 5 as well as a storage container 6 with an individualization device 7 are disposed at each support beam 3 of the side segments 4. The side segments 4 are to be swiveled by 90 degrees out of the working position shown in FIG. 1 into the transport position shown in FIG. 2 by way of setting elements not illustrated, but preferably formed as hydraulic cylinder, wherein the setting elements are disposed between the middle frame 1 and the support beams 3 of the side elements 4. The sowing machine comprises the storage container 6 and the individualization device 7. disposed below the respective storage container 6 rotatably disposed and rotatingly driven in a casing 8 and formed as an individualization drum 9. Circularly disposed perforation rows are disposed in the circumferential face of the individualization drum 9. The storage container 6 and the casing 8 above the drum 9 are at least approximately pressure tight closed by way of a cover. The storage container 6 and the casing 8 above the drum 9 are subjectable to compressed air through the pressure blower not illustrated and connected in the connection box 10 such that the perforation rows are subjected to a pressure difference between the inner chamber 11 of the individualization drum 9 and the outer region 12 of the individualization drum 9. Based on this pressure difference the seed grains rest at the perforation rows of the individualization drum 9, while the individualization drum 9 passes through the seeds storage 13, wherein the seeds storage 13 extends up to below the rotation axis of the drum 9 based on the guiding of the seeds shaft 12. The seeds storage container 6 or, respectively, the casing below the seeds storage container 6 exhibits the side walls 14 at a distance from each other, which side walls 14 extend parallel to the rotation direction of the drum 9 and which cooperate at least approximately sealingly with the drum 9. The individualization drum 9 is rotatingly and sealingly supported in the seeds storage container 6 or, respectively, in the casing below the seeds storage container 6.

The axis of the individualization drum 9 is disposed horizontally when the sowing machine is in working position and vertically when the sowing machine is in transport position. The seeds are placed on the individualization drum pneumatically and against their gravity.

The separation wall 15 separates the seeds guide shaft 16 connected successively to the seeds storage container 6 from the individualizing region 17 of the drum 9 of the individualization device 7. The blocking device 19 formed as a swivelable flap 18 is disposed between the individualization device 7 formed as a drum 9 and the separating wall 15 and in the region of the lower end of the separating wall 15 and above the seeds storage height level. The blocking device 19 is pivotable around the swivel axis 21 running through the swivel hinge 20 at the side walls 14. The swivel axis 21 is disposed in the neighborhood of the lower end of the separating wall 15. The intermediate space 22 between the separating wall 15 or, respectively, the seeds feed shaft and the drum 9 can be closed by way of the flap 18. The setting element 23 is formed as a simply operating hydraulic cylinder with coordinated pulling spring according to the embodiment example. For this purpose, the setting element 23 coordinated to the flap 18 is moved from the parking position illustrated in FIGS. 3 and 4 into the blocking position illustrated in FIG. 5, wherein the flap 18 closes the intermediate space 22 between the drum 9 and the seeds feed shaft 16. The intermediate space 22 between the seeds guide shaft 16 and the drum 9 is open in the parking position. The intermediate space 22 is open during the delivery of the seeds by the flap 18 disposed in parking position. The intermediate space 22 is closed by the blocking device 29 formed as a flap 18 for not allowing that any seeds pass through the intermediate space 22 prior to bringing the machine into the transport position shown in FIG. 2, that is the storage container 6 with the individualization device 7 is the swivelled by 90 degrees when going from working position into transport position.

The axis of the flap 18 is disposed substantially parallel to the axis of the drum 9. The flap 18 when in parking position is disposed more or less vertically. The flap 18 when in a blocking position is disposed more or less horizontally. The edge of the flap disposed remote from the axis of the flap comes into close spaced contact with the outer cylindrical surface of the drum 9.

Figure 6:
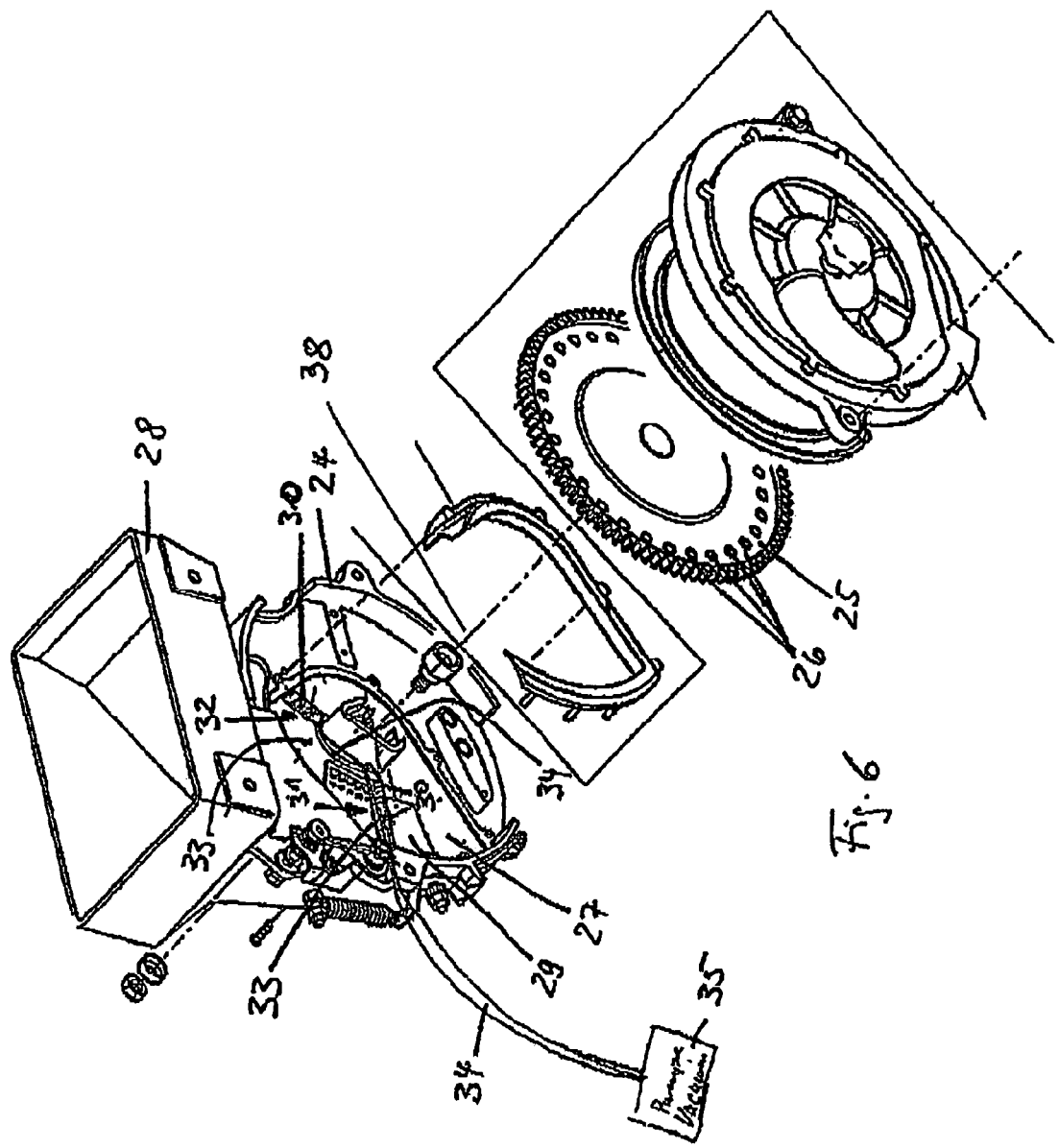
FIG. 6 is a simplified view of an individualization device of a further individualization sowing machine and in an exploded view and a perspective view.

Another individualization device of a single grain sowing machine is shown in FIG. 6. The individualization disk 25 is disposed individualization casing 24. Perforations 26 subjectable to suctioned air are applied in the individualization disk 25, wherein seed grains rest at the perforations 26 while the individualization disk 25 and the perforations 26 are guided through the seeds storage, wherein this seeds storage is disposed in the seeds storage region 27 in the individualization casing 24. These seed grains pass from the storage container 28, which is placed on top of the individualization casing 24, through the seed feed channel 29 into the seeds storage region 27. The inflatable or, respectively, swelling tubular like jacket 30 forming the blocking device is disposed in the individualization casing 24 above the feed channel 29. Furthermore, also a tubular like jacket 30 formed inflatable or swelling and furnishing a blocking device is disposed in the upper region of the casing 24. The jackets 30 close in their expanded state in each case the intermediate space 31 and 32 located between the individualization device formed as the individualization disk 25 and the separating wall 33 of the casing 34.

Form and construction of the tubular like jacket 30 is illustrated in the FIGS. 7 to 10 and is further explained and illustrated by way of these figures in the following:

The tubular like jacket 30 is attached at the separating wall 33 of the casing 24, wherein here the tubular like jacket 30 can be formed differently with respect to its basic behavior.

In case the tubular like jacket 30 assumes the cross-section illustrated in FIG. 7 without that the jacket is subjected to a force, then the jacket blocks in its expanded state the intermediate space 31 between the disk 25 and the separating wall 33. Such an expanded state can be assumed by the tubular like jacket 30 based on the material and shape properties of the jacket 30. In case the tubular like jacket is to be brought into the parking position, that is that the intermediate space 31, 32 between the separating wall 33 and the disk 25 are to be released according to FIG. 8, then the tubular like jacket 30 is subjected to an under pressure.

For this purpose the tubular like jacket 30 is connected through a connection hose 34 to a simplified illustrated vacuum pump 35.

However it is also possible that the tubular like jacket 30 based on its material and shape properties assumes the parking position illustrated in FIG. 8 without that a force operates on the tubular like jacket 30. The intermediate space 31, 32 between the separating wall 33 and the individualization disk 25 is released in the parking position. The tubular like jacket 30 is subjected to an over pressure, that is the jacket is blown up in order to block the intermediate space 31, 32 between the individualization disk 25 and the separating wall 33. The tubular like jacket is for this purpose connected through a connection hose 34 accordingly with a compressed air pump.

The tubular like jacket 35 is filled with a foam material 36 according to FIG. 9, wherein the foam material 36 holds the tubular like jacket 35 in the illustrated expansion position such that the intermediate space 31, 32 between the separating wall 33 toward the storage container .28 and the individualization disk 25 is closed. In order to allow the tubular like jacket 35 to collapse, the tubular like jacket is connected through a hose 34 to a vacuum pump such that the tubular like jacket 35 becomes evacuated by way of an under pressure and thereby collapses and releases the intermediate space 31, 32 between the separating wall 33 and the individualization disk 25 as shown in FIG. 10.

It is also possible that mechanical elements operate onto the tubular like jacket 35 for deforming the tubular like jacket 35 or for relaxing the tubular jacket 35.

It will be understood that each of the elements described above, or two or more together, may also find a useful application in other types of sowing system configurations and seed individualization processing procedures differing from the types described above.

While the invention has been illustrated and described as embodied in the context of a single grain sowing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. Pneumatic single grain sowing machine with a seeds storage container, and an individualization device subjected to air pressure, exhibiting perforations (26), and rotating, wherein the individualization device with its region disposed below a rotation axis (38) is guided at least in part to a seed storage led through the storage container at the individualization device for placing seed grains at the perforations (26), wherein a separating wall is disposed between the storage container and the individualization device, wherein the separating wall determines the seeds storage height level and extends at a distance to the individualization device in a vertical direction, characterized in that an adjustable blocking device (18, 19, 30, 35) is disposed between the individualization device (7, 9, 25) and the separating wall (15, 33) in the region of the lower end of the separating wall (15, 33) and above the seeds storage height level and wherein the blocking device (18, 19, 30, 35) closes in an intermediate space (22, 31, 32) between the individualization device (7, 9, 25) and the separating wall (15, 33).

2. The single grain sowing machine according to claim 1 wherein the blocking device (19) is formed as a flap (18) pivotable around a swivel axis (21).

3. The single grain sowing machine according to claim 2 wherein the swivel axis of the flap (18) is disposed in the neighborhood of the lower end of the separating wall (15).

4. The single grain sowing machine according to claim 1 wherein the blocking device is formed as an inflatable or swelling tubular like jacket (30, 35).

5. The single grain sowing machine according to claim 4 wherein the tubular like jacket (30, 35) is evacuated with under pressure and thereby collapses and releases the intermediate space (31, 32) to be blocked.

6. Pneumatic single grain sowing machine comprising a seeds storage container;
an individualization device subjected to air pressure, exhibiting perforations, and rotating, wherein the individualization device with its region disposed below the rotation axis is guided at least in part to a seed storage led through the storage container at the individualization device for placing seed grains at the perforations;
a separating wall, wherein the separating wall is disposed between the storage container and the individualization device, wherein the separating wall determines the seeds storage height level and extends at a distance to the individualization device in a vertical direction;
an adjustable blocking device (18, 19, 30, 35) disposed between the individualization device (7, 9, 25) and the separating wall (15, 33) in a region of the lower end of the separating wall (15, 33) and above the seeds storage height level; and
an intermediate chamber (22, 31, 32) disposed between the individualization device (7, 9, 25) and the separating wall (15, 33), wherein the blocking device (18, 19, 30, 35) closes in the intermediate chamber (22, 31, 32).

7. The single grain sowing machine according to claim 6 wherein the blocking device (19) is formed as a flap (18) pivotable around a swivel axis (21).

8. The single grain sowing machine according to claim 7 wherein the swivel axis of the flap (18) is disposed in the neighborhood of the lower end of the separating wall (15).

9. The single grain sowing machine according to claim 6 wherein the blocking device is formed as an inflatable or swelling tubular like jacket (30, 35).

10. The single grain sowing machine according to claim 9 wherein the tubular like jacket (30, 35) is evacuated with under pressure and thereby collapses and releases the intermediate chamber (31, 32) to be blocked.

11. A method for single grain sowing comprising the steps:
placing a side segment of a single grain sowing machine from a transport position into a working position,
opening up a passage between a separating wall and an individualization drum (9) having perforations by releasing a blocking device for allowing flow of seed grains toward the individualization drum (9) having perforations;
feeding seed grains from a storage container along a separating wall toward an individualization drum (9) having perforations;
rotating the individualization drum (9) having perforations for individualizing seed grains placed in perforations;

stopping the rotation of the individualization drum (9) having perforations; closing off the passage between the separating wall and the individualization drum (9) with the blocking device for preventing undesirable flow of seed grains in the area of the individualization drum (9) having perforations;

placing the side segment of the single grain sowing machine from the working position into the transport position.

\* \* \* \* \*